(12) United States Patent
Johns

(10) Patent No.: US 10,831,892 B2
(45) Date of Patent: Nov. 10, 2020

(54) WEB BROWSER SCRIPT MONITORING

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 16/002,412

(22) Filed: Jun. 7, 2018

(65) Prior Publication Data
US 2019/0377877 A1  Dec. 12, 2019

(51) Int. Cl.
*G06F 21/56* (2013.01)
*H04L 29/06* (2006.01)

(52) U.S. Cl.
CPC ........... *G06F 21/563* (2013.01); *G06F 21/56* (2013.01); *G06F 21/561* (2013.01); *H04L 63/1416* (2013.01); *H04L 63/1425* (2013.01); *H04L 63/1441* (2013.01); *G06F 2221/033* (2013.01)

(58) Field of Classification Search
CPC ............. H04L 63/1416; H04L 63/1425; H04L 63/1441; G06F 21/561; G06F 21/563; G06F 21/56
See application file for complete search history.

(56) References Cited

U.S. PATENT DOCUMENTS

| | | | | |
|---|---|---|---|---|
| 6,584,569 B2 * | 6/2003 | Reshef | ................. | G06F 21/554 709/203 |
| 6,963,978 B1 * | 11/2005 | Muttik | ................. | G06F 21/564 713/188 |
| 7,237,265 B2 * | 6/2007 | Reshef | ................. | G06F 21/554 726/25 |
| 8,112,799 B1 * | 2/2012 | Loiodice | ................. | G06F 21/51 709/223 |
| 8,713,679 B2 * | 4/2014 | Zorn | ................. | G06N 7/005 726/23 |
| 8,843,820 B1 * | 9/2014 | Kay | ................. | G06F 21/51 715/234 |
| 8,949,990 B1 * | 2/2015 | Hsieh | ................. | G06F 21/577 726/22 |

(Continued)

OTHER PUBLICATIONS

O. Starov and N. Nikiforakis, "XHOUND: Quantifying the Fingerprintability of Browser Extensions," 2017 IEEE Symposium on Security and Privacy (SP), San Jose, CA, 2017, pp. 941-956. (Year: 2017).*

(Continued)

*Primary Examiner* — Kari L Schmidt
(74) *Attorney, Agent, or Firm* — Schwegman Lundberg & Woessner, P.A.

(57) ABSTRACT

Various examples are directed to systems and methods for securing a web browser. The web browser may parse web content received from a server and identify a script associated with the web content. The web browser may generate script fingerprint data for the script. The script fingerprint data may comprise script code data describing script code for the script and script syntax data describing the script. The web browser may determine that the script fingerprint data is not described by local known script data and may send an anomalous script report to the server, where the anomalous script report comprising the script fingerprint data. The web browser may also update the local known script data to describe the script fingerprint data.

19 Claims, 9 Drawing Sheets

(56) References Cited

U.S. PATENT DOCUMENTS

| | | | | |
|---|---|---|---|---|
| 8,997,233 B2* | 3/2015 | Green | | G06F 21/566 |
| | | | | 726/24 |
| 9,038,184 B1* | 5/2015 | Mann | | G06F 21/562 |
| | | | | 726/24 |
| 9,178,904 B1* | 11/2015 | Gangadharan | | G06F 21/00 |
| 9,231,975 B2* | 1/2016 | Johns | | H04L 63/20 |
| 9,398,032 B1* | 7/2016 | Wan | | G06F 21/566 |
| 9,654,495 B2* | 5/2017 | Hubbard | | H04L 63/1483 |
| 9,830,453 B1* | 11/2017 | Feiertag | | G06F 21/562 |
| 9,904,522 B2* | 2/2018 | Zhang | | G06F 8/656 |
| 9,977,900 B2* | 5/2018 | Wang | | G06F 21/562 |
| 10,318,732 B2* | 6/2019 | MacDermid | | H04L 63/1466 |
| 2002/0156855 A1* | 10/2002 | Ueno | | G06Q 10/107 |
| | | | | 709/206 |
| 2004/0181677 A1* | 9/2004 | Hong | | G06F 21/563 |
| | | | | 713/188 |
| 2007/0113282 A1* | 5/2007 | Ross | | G06F 21/566 |
| | | | | 726/22 |
| 2009/0070663 A1* | 3/2009 | Fan | | G06F 21/562 |
| | | | | 715/234 |
| 2009/0119769 A1* | 5/2009 | Ross | | G06F 21/56 |
| | | | | 726/13 |
| 2009/0138937 A1* | 5/2009 | Erlingsson | | G06F 21/305 |
| | | | | 726/1 |
| 2011/0072262 A1* | 3/2011 | Amir | | G06F 21/52 |
| | | | | 713/168 |
| 2011/0239294 A1* | 9/2011 | Kim | | G06F 21/563 |
| | | | | 726/22 |
| 2012/0266244 A1* | 10/2012 | Green | | G06F 21/566 |
| | | | | 726/24 |
| 2013/0238970 A1* | 9/2013 | Getzin | | G06F 16/9566 |
| | | | | 715/234 |
| 2015/0007251 A1* | 1/2015 | Johns | | H04L 63/20 |
| | | | | 726/1 |
| 2015/0067472 A1* | 3/2015 | Chen | | G06F 16/9577 |
| | | | | 715/234 |
| 2015/0082424 A1* | 3/2015 | Shukla | | H04L 63/123 |
| | | | | 726/22 |
| 2015/0096006 A1* | 4/2015 | Chu | | G06F 21/128 |
| | | | | 726/9 |
| 2015/0256556 A1* | 9/2015 | Kaminsky | | H04L 63/1433 |
| | | | | 726/23 |
| 2016/0180086 A1* | 6/2016 | Ladikov | | G06F 21/51 |
| | | | | 726/23 |
| 2016/0182563 A1* | 6/2016 | Sambandam | | H04L 63/123 |
| | | | | 726/22 |
| 2016/0359875 A1* | 12/2016 | Kim | | H04L 63/1416 |
| 2018/0103043 A1* | 4/2018 | Kupreev | | H04L 63/1483 |
| 2018/0300480 A1* | 10/2018 | Sawhney | | G06F 21/563 |

OTHER PUBLICATIONS

B. Liang, J. Huang, F. Liu, D. Wang, D. Dong and Z. Liang, "Malicious Web Pages Detection Based on Abnormal Visibility Recognition," 2009 International Conference on E-Business and Information System Security, Wuhan, 2009, pp. 1-5. (Year: 2009).*

Gómez-Boix, Alejandro, Pierre Laperdrix, and Benoit Baudry. "Hiding in the crowd: an analysis of the effectiveness of browser fingerprinting at large scale." Proceedings of the 2018 world wide web conference. 2018, pp. 309-318. (Year: 2018).*

Mitropoulos, Dimitris, et al. "How to train your browser: Preventing XSS attacks using contextual script fingerprints." ACM Transactions on Privacy and Security (TOPS) 19.1 (2016): pp. 1-31. (Year: 2016).*

* cited by examiner

WEB BROWSER SCRIPT MONITORING

TECHNICAL FIELD

This document generally relates to methods and systems for use with computer devices, including networked computing devices, More particularly, this document relates to systems and methods for secure web browser operation utilizing script monitoring.

BACKGROUND

Web browsers request and render content that can include scripts, which are interpreted routines executed at the client devices that execute the web browser. Scripts are executed, for example, in the web browser, to provide different types of functionality to users.

BRIEF DESCRIPTION OF DRAWINGS

The present disclosure is illustrated by way of example, and not limitation, in the following figures.

DETAILED DESCRIPTION

Figure 1:
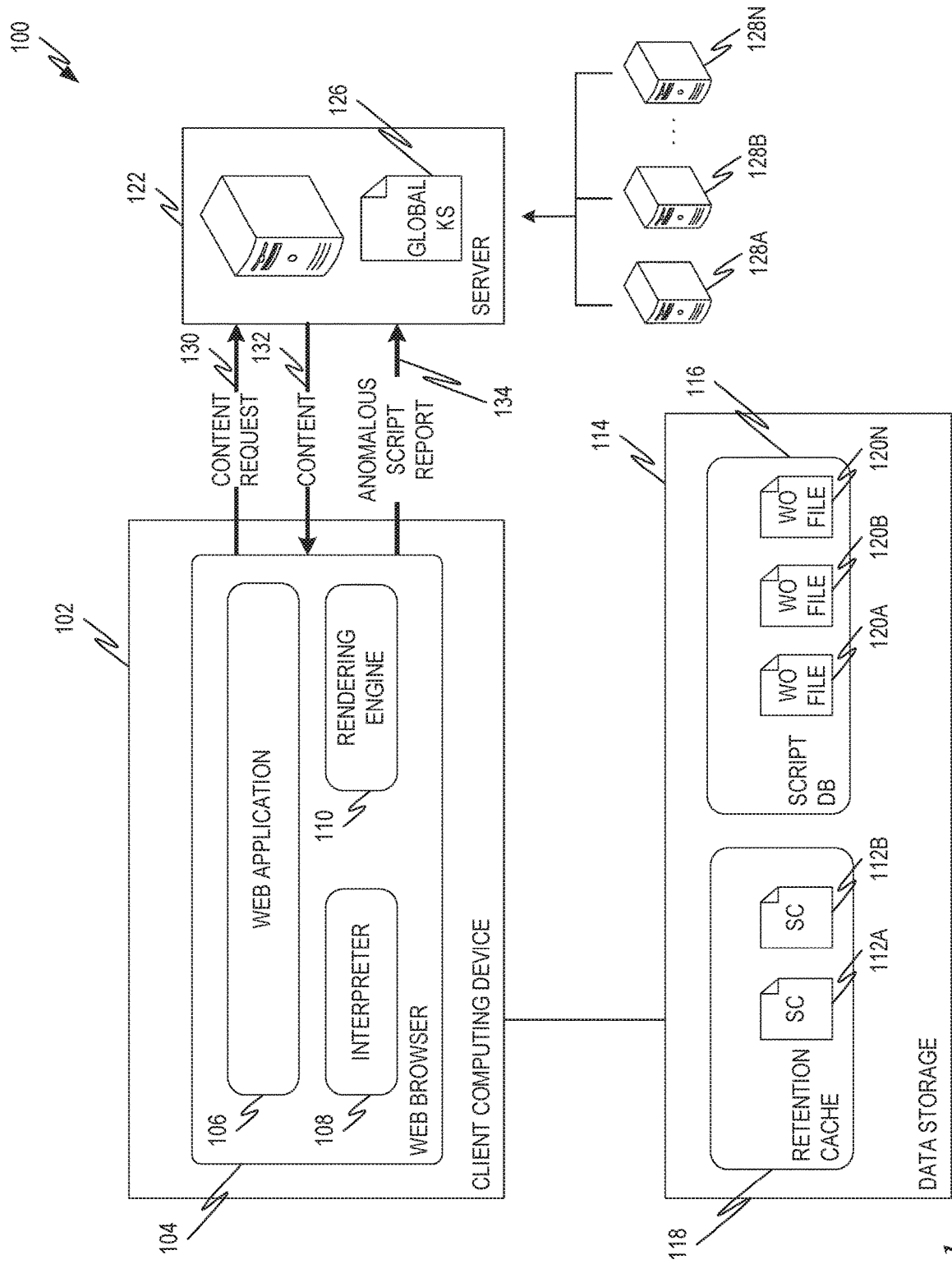
FIG. 1 is a diagram showing one example of an environment for web browser script monitoring.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details, in general, well-known instruction instances, protocols, structures, and techniques have not been shown in detail.

Various examples described herein are directed to systems and methods that monitor scripts executed, for example, at a web browser of a client computing device. The web browser generates script fingerprint data that describes scripts executed by the web browser. In some examples, the web browser maintains a script database that stores script fingerprint data for scripts executed at the web browser. The script database may index or otherwise organize script fingerprint data according to the web origin of the corresponding scripts.

Script fingerprint data includes script code data and script syntax data. Script code data describes the code to execute the script. The script code may be interpreted code that is executed using an interpreter. Script syntax data describes the syntactic structure of the script. As described herein, scripts may be static or dynamic. A static script is repeatedly executed from the same script code. Dynamic scripts, as described herein, are executed with different script code at different times. For example, a dynamic script may maintain the same syntactic structure, but with different forms such as, for example, different identifier values, different function values, different object or variable names, etc. Changes to dynamic scripts may be made on the fly by a web application or other content rendered at the web browser.

The script fingerprint data described herein may be used to detect and, in some examples, to prevent client-side scripting attacks, such as cross-site scripting (XSS) attacks. In an XSS attack, an attacker injects malicious script into web content received at the web browser. When executed, the malicious script performs a malicious activity such as, for example, stealing a user's confidential information, stealing a session identifier (SID), using a stolen SID to request fraudulent actions from the server, etc.

In some examples, script fingerprint data stored at the script database can be used when an attack is suspected. For example, the script fingerprint data stored at the script database may be used to identify scripts executed in the web browser including, for example, any malicious scripts that may have been executed. Also, in some examples, the client computing device compares script fingerprint data to known script fingerprint data to determine Whether a script is known, either locally to the client computing device or globally to the web origin associated with the script.

The methods and systems described herein provide notable advantages. For example, generating script fingerprint data on the client side, as described herein, provides a record of scripts executed on the client side that may be used later for debugging and/or for the detection of client-side scripting attacks. Also, script fingerprint data including script code data and script syntax data, as described herein, may allow the client computing device and/or the server to compare the script fingerprint data from dynamic scripts to script fingerprints of previously-executed iterations of the dynamic script. In this way, the web browser and/or server may determine if a newly encountered script is anomalous. For example, an anomalous script may be a script that is anomalous to web browser or is a new iteration of a known dynamic script.

FIG. 1 is a diagram showing one example of an environment 100 for web browser script monitoring. The environment 100 includes client computing devices 102, 128A, 128B, 128N that are in communication with a server computing device 122, also referred to herein as a server 122. The client computing devices 102, 128A, 128B, 128N may be or include any suitable computing devices, such as, for example, desktop computers, laptop computers, tablet computers, mobile phones or similar devices, etc. Similarly, the server 122 may be or include any suitable computing device or devices. The server 122 may execute one or more web server routines that provide content and/or perform operations in response to request messages. Examples of hardware and software arrangements for computing devices that may make up all or part of the client computing device 102 and/or server 122 are provided herein with reference to FIGS. 8 and 9.

In the example shown in FIG. 1, the client computing device 102 executes a web browser 104. The web browser 104 may be or include any suitable web browser including, for example, the Chrome® browser available from Google Inc., the Firefox® browser available from Mozilla. Foundation, the Safari® browser available from Apple Inc., the Internet Explorer® browser available from Microsoft Corporation, the Microsoft Edge® browser available from Microsoft Corporation. The web browser 104 includes a rendering engine 110 and an interpreter engine 108. The rendering engine 110 renders web content received from the server 122. For example, the rendering engine 110 may convert web content, for example, in Hypertext Markup Language (HTML), into commands that cause the appropriate text, sounds, and/or images to be output by the client computing device 102. The interpreter engine 108 interprets scripts received with web content and/or generated by web content received from the server 122. For example, the interpreter engine 108 may be arranged to interpret JavaScript code.

In some examples, the client computing device 102 executes a web application 106 in the web browser 104. The web application 106 may manage the display of web content, interactions with a user, and/or other aspects of web content displayed through the web browser 104. The web application 106, in some examples, includes script code received from the server 122. Also, in some examples, the web application 106 calls for the execution of other scripts at the web browser 104. In some examples, the web application 106 generates or modifies dynamic scripts to be executed at the web browser 104 as a user of the client computing device 102 interacts with web content rendered at the web browser 104.

The user of the client computing device 102 accesses the web content by launching the web browser 104 and selecting a Universal Resource Locator (URL) or other address associated with the server 122. The address may be referred to as a web origin. The web browser 104 sends to the server 122 a request 130 for web content. For example, the request 130 may be directed to the web origin associated with the server 122. The web browser 104 receives, from the server 122, a response message 132 including the requested web content. The rendering engine 110 and/or interpreter engine 108 is used to render the web content and to execute any scripts that are part of the web content and/or generated by the web content. Additional requests and replies may be exchanged between the client computing device 102 and the server 122, for example, as a user of the client computing device 102 interacts with the web content. The request message 130 and response message 132, in some examples, are arranged according to the Hypertext Transfer Protocol (HTTP) syntax.

When rendered and/or executed, the web content can provide various different types of functionality to a user of the client computing device 102. For example, web content may provide textual, audio, or video content describing current events, sports, cultural, or other content. In some examples, the web content also provides functionality to the user. For example, the web content may include a web application 106 that provides the user with functionality for executing financial transactions, making electronic purchases, accessing secure business applications, etc.

The client computing device 102 includes data storage 114. The data storage 114 may include one or more hardware devices for storing data. Example hardware devices for storing data include memory, such as Random Access Memory (RAM), and persistent storage such as, for example, one or more disk drives, one or more solid state drives, etc. The data storage 114 includes a script database 116 including known script data. Optionally, the data storage 114 also includes a retention cache 118 that stores script code 112A, 112B of some or all of the executed scripts.

In some examples, the web browser 104 (e.g., the interpreter engine 108, the rendering engine 110, and/or a web application 106) is configured to identify locally anomalous scripts. Locally anomalous scripts include scripts that are not described by script fingerprint data at the script database 116 that is associated with the web origin of the anomalous script. For example, anomalous scripts include scripts that are unknown to the web browser 104 for a given web origin. For example, a locally anomalous script may be a script that is not described by script fingerprint data associated with the script's web origin.

When script fingerprint data is generated for a script, the web browser 104 may be programmed to compare the script fingerprint data to local known script data from the script database 116 for the web origin of the considered script. Local known script data, for example, includes script fingerprint data from scripts from the same web origin as the considered script. In the example of FIG. 1, the local known script data at the script database 116 is organized into web origin records 120A, 120B, 120N where each web origin record 120A, 120B, 120N includes script fingerprint data from scripts originating from the corresponding web origin. In some examples, script fingerprint data in web origin records 120A, 120B, 120N is classified into static scripts and dynamic scripts. For example, a static script list in a web origin record 120A, 120B, 120N includes script fingerprint data describing known static scripts while a dynamic script list in a web origin record 120A, 120B, 120N includes script fingerprint data describing known dynamic scripts. Examples describing how script fingerprint data may be compared with known script data are described in more detail herein with respect to FIG. 5.

Figure 6:
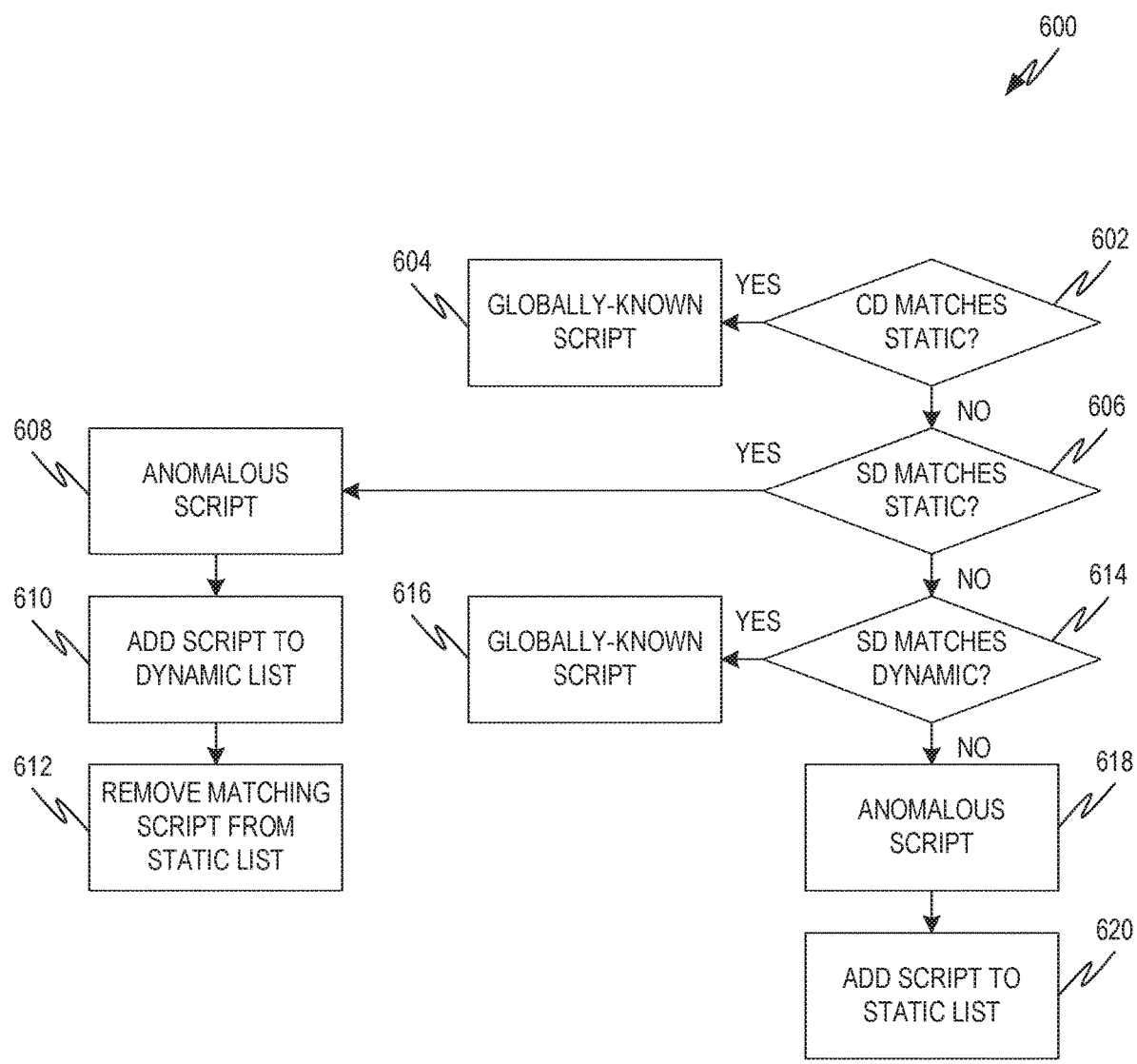
FIG. 6 is a flowchart showing one example of a process flow that may be executed by a server to compare script fingerprint data for a locally anomalous script to global known script data.

If the script fingerprint data for a considered script is not described by known script data at the script database 116, then the web browser 104 may send an anomalous script report 134 to the server 122. The anomalous script report 134 may include the script fingerprint data for the considered script and an indication that the considered script is locally anomalous (e.g., not described by script fingerprint data associated with the web origin at the script database 116). The server 122 receives the anomalous script report 134 and may compare the script fingerprint data with global known script data 126. The global known script data 126 may describe scripts that have been encountered by some or all of the client computing devices 128A, 128B, 128N that have received web content from the same web origin as the considered script. In some examples, global known script data 126 is also organized into a static script list including script fingerprint data for globally-known static scripts and a dynamic script list including script fingerprint data for globally-known dynamic scripts. FIG. 6 shows one example way that the server 122 can compare script fingerprint data for the considered script to the global known script data 126.

If the script fingerprint data is not described by the global known script data 126, the considered script may be globally anomalous (e.g., the considered script has not been encountered by any client computing device 128A, 128B, 128N, 102 that receives web content from the web origin and reports scripts). If the considered script is globally-anomalous, the server 122 may take a remedial action. Example remedial actions include requesting that the web browser 104 provide a copy of the script code of the considered script for further analysis, instructing client computing devices 128A, 128B, 128N, 102 not to execute the considered script, etc.

Figure 2:
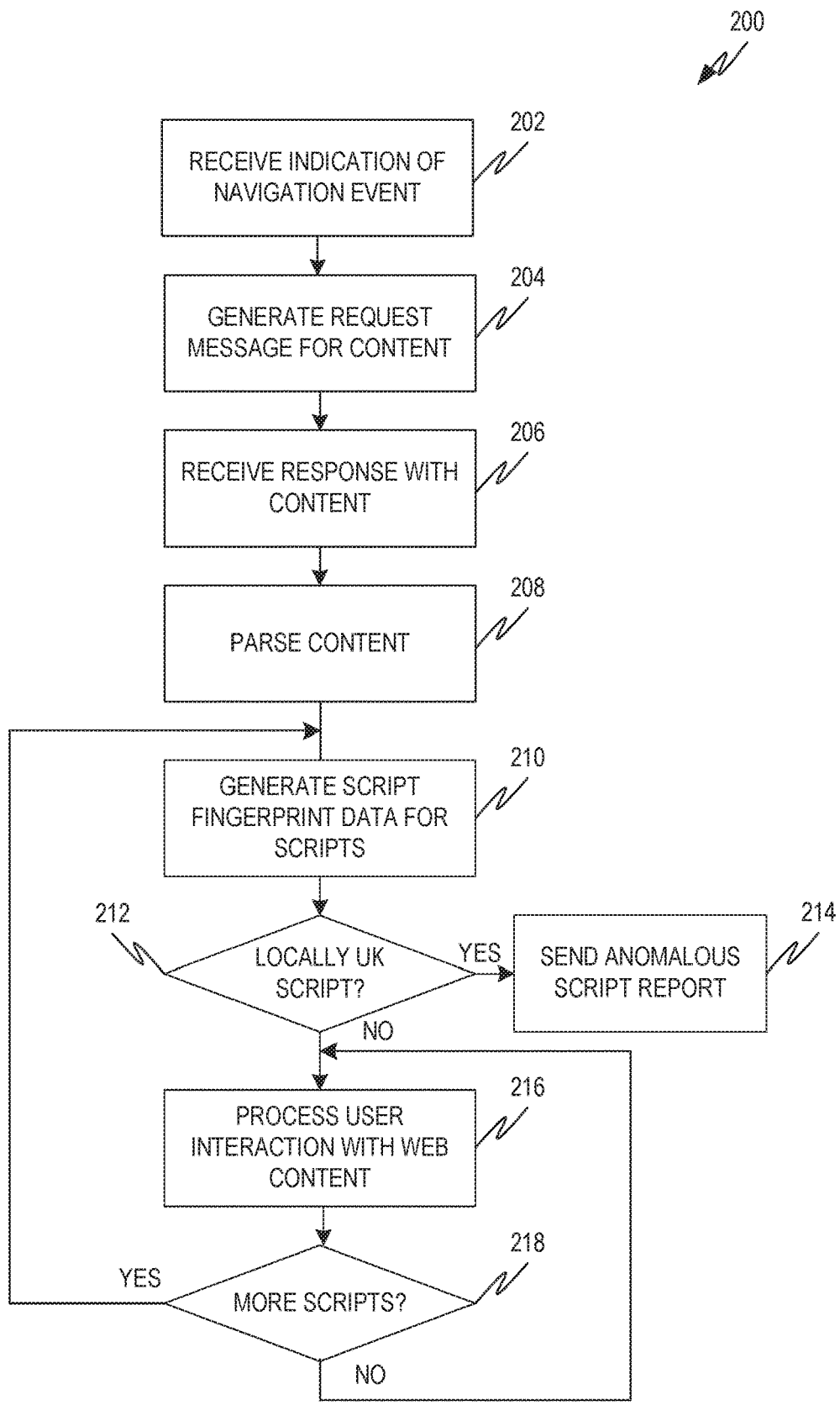
FIG. 2 is a flowchart showing one example of a process flow that may be executed by the web browser of FIG. 1 to generate and process fingerprint data describing a script.

FIG. 2 is a flowchart showing one example of a process flow 200 that may be executed by the web browser 104 to generate and process fingerprint data describing a script. The process flow 200 is described as being executed by the web browser 104. Various operations of the process flow 200 may be executed, for example, by the interpreter engine 108, the rendering engine 110, and/or the web application 106.

At operation 202, the web browser 104 receives an indication of a navigation event. A navigation event occurs when the web browser 104 is prompted to load new web content (e.g., HTML content) into a web container such as, for example, a web browser tab, an i-frame, or other suitable web container. For example, a navigation event may occur when a user of the client computing device 102 selects a link to a particular URL or other address, types a particular URL or other address into an address field of the web browser 104, etc.

At operation 204, the web browser 104 generates a request 130 for web content. The request 130 is directed to the web origin indicated by the address of the navigation event. In the example of FIG. 1, the web origin corresponds to the server 122. The request 130 for web content may be formatted, for example, according to HTTP or any other suitable syntax. The server 122 responds to the request for web content by sending a response message 132 including the requested web content. The requested web content may include, for example, text, images, script code for a web application 106 or other suitable scripts, etc. The web browser 104 receives the response message 132 with the requested web content at operation 206.

At operation 208, the web browser 104 parses the received web content. In some examples, the parsing is performed by the rendering engine 110, During the parsing, the web browser 104 identifies scripts included with the requested web content, which may be referred to as inline scripts. For example, parsing the web content may include identifying script code included with the requested web content.

At operation 210, the web browser 104 generates script fingerprint data for a script or scripts included with the received web content. As described herein, the script fingerprint data includes script code data describing script code and script syntax data describing script syntax. An example way of generating script fingerprint data is described herein with respect to FIG. 4. At operation 212, the web browser 104 determines whether script fingerprint data generated at operation 210 indicates any script or scripts that are locally anomalous. This may include comparing script fingerprint data for one or more considered scripts to known fingerprint data from the script database 116. An example way of comparing script fingerprint data to known script data is described herein with respect to FIG. 5. If the script is locally anomalous, the web browser 104 sends an anomalous script report, for example, to the server 122.

At operation 216, the web browser 104 processes user interactions with the requested web content. For example, the user may select links in the web content, play video or audio embedded in the web content, interact with a web application 106 from the web content, etc. User interactions with the web content may cause the web browser 104 to execute additional scripts, which may be referred to as eval scripts. At operation 218, the web browser 104 determines if any additional scripts are identified or executed from the user's interaction with the web content. The additional scripts may arise in any suitable circumstance. For example, executed scripts from the received web content can cause the execution of code (e.g., JavaScript code) that has not yet been evaluated. For example, the web content may include code that utilizes an eval Application Programming Interface (API) to cause the execution of a text string or other not-previously evaluated code. Also, in some examples, the web content may trigger an inline event handler script that, for example, may be attached to a document object model (DOM) element of the web content. Also, a script executed from the requested web content may dynamically load one or more additional scripts.

If an additional script or scripts is identified at operation 218, the web browser 104 may, at operation 210, generate script fingerprint data for the additional script or scripts as described herein. If no additional script or scripts are identified, the web browser 104 may, at operation 216, continue to process the user's interaction with the web content, for example, until that interaction is complete (e.g., when the user closes the web container in which the content is rendered).

In some examples, the server 122 provides script fingerprint data for globally known scripts to the web browser 104 at the client computing device 102, for example, with the web content at operation 206. The web browser 104 may store the script fingerprint data at the script database 116, for example, at a web origin record 120A, 120B, 120N corresponding to the web origin. Accordingly, when the web browser 104 determines at operation 212 whether a script is locally anomalous, the web browser 104 may consider scripts encountered by the web browser 104 from the web origin and scripts indicated as globally known scripts by the server 112.

Figure 3:
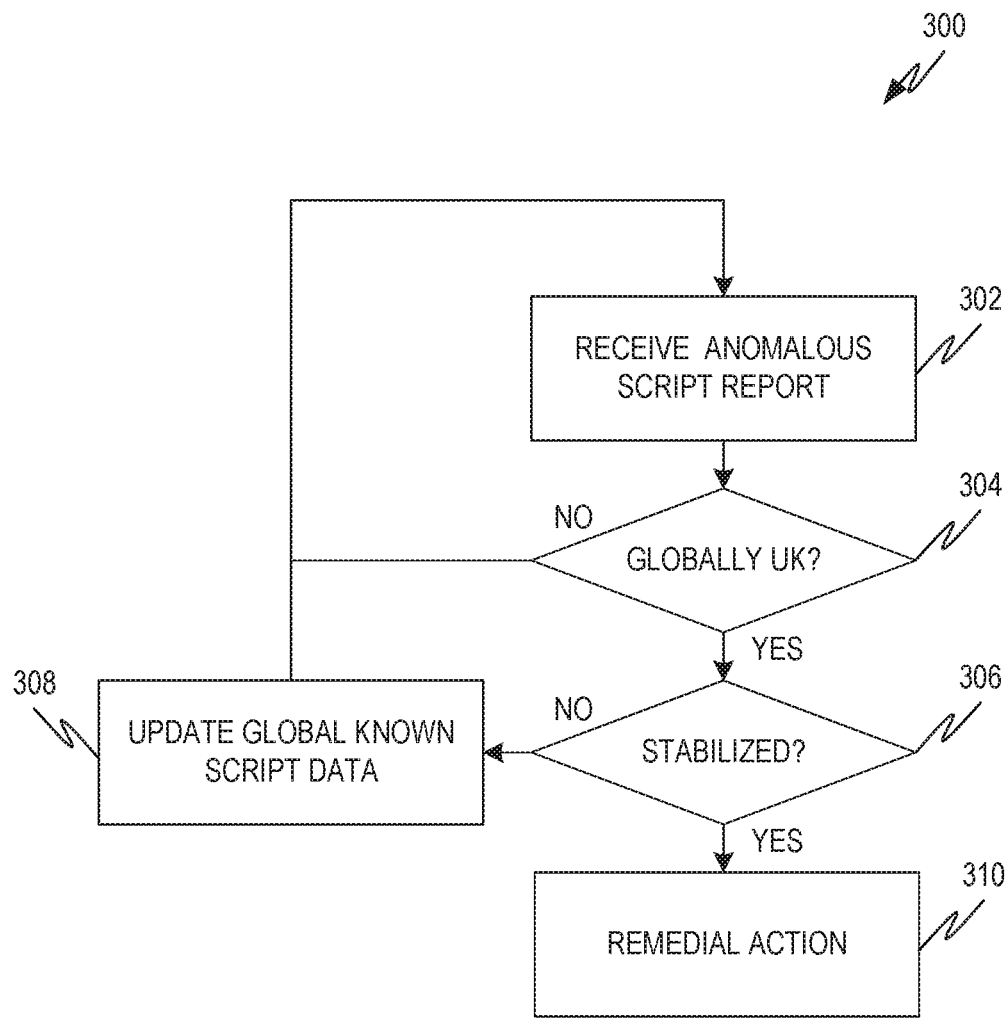
FIG. 3 is a flowchart showing one example of a process flow that may be executed by the server of FIG. 1 to process an anomalous script report received from the web browser of FIG. 1.

FIG. 3 is a flowchart showing one example of a process flow 300 that may be executed by the server 122 to process an anomalous script report 134 received from the web browser 104. At operation 302, the server 122 receives the anomalous script report 134 including script fingerprint data describing a locally anomalous script (e.g., a script that was unknown for the web origin at the web browser 104). At operation 304, the server 122 determines whether the locally anomalous script is globally-anomalous. A globally-anomalous script is a script that is not described by global known script data 126 at the server 122. For example, a globally-anomalous script may not have been encountered from the web origin by any client computing devices 128A, 128B, 128N including web browsers rendering content from the web origin. To determine whether the locally anomalous script is globally-anomalous, the server 122 compares the script fingerprint data for the locally anomalous script to the global known script data 126. The global known script data 126 may include script fingerprint data from scripts that have been encountered from the web origin by the client computing device 102 and other client computing devices 1284, 128B, 128N requesting web content from the web origin at the server 122. An example showing how the server

122 can compare script fingerprint data to global known script data 126 is provided herein at FIG. 6.

If the considered script is not globally-anomalous, then the server 122 may proceed to operation 302, where it receives the next anomalous script report from the web browser 104 and/or from another client computing device 1284, 128B, 128N. If the considered script is globally-anomalous, then, at operation 306, the server 122 determines if the global known script data 126 from a web origin has stabilized. The global known script data 126 from a web origin stabilizes, for example, when the client computing devices 1284, 128B, 128N, 102 have encountered all of the scripts that are included in web content from the web origin and are likely to be generated, requested, or otherwise encountered during user interaction with the web content. The server 122 may determine whether the global known script data 126 for a web origin has stabilized in any suitable manner. For example, the server 122 may determine that the global known script data 126 for web origin has stabilized if more than a threshold number of client computing devices 1284, 128B, 128N providing script fingerprint data have received the web content. In some examples, the server 122 determines that global known script data 126 for the web origin has stabilized when it has processes more than a threshold number of HTTP responses or rendered web documents have been provided to client computing devices 1284, 128B, 128N since new fingerprint data for a new script has been received.

If the global known script data 126 for the web origin is not stabilized, then, at operation 308, the server 122 updates the global known script data 126 to add script fingerprint data describing the anomalous script. The server 122 may then proceed to operation 302 to receive the next anomalous script report from the web browser 104 at the client computing device 102 and/or from another client computing device 1284, 128B, 128N.

If the script fingerprint data for the web origin is stabilized, the server 122 takes a remedial action at operation 310. The remedial action is taken, as described, when the server 122 receives an indication of a globally-anomalous script that has not been reported by any client computing device 102, 128A, 128B, 128N, Accordingly, the remedial action may be directed towards determining whether the globally-anomalous script is malicious, mitigating the effects of the globally-anomalous script until it is determined whether it is malicious, mitigating the effects of the globally-anomalous script if it is determined to be malicious, etc. In some examples, the remedial action includes requesting that the web browser 104 provide a copy of the script code of the globally-anomalous script to the server 122, for example, as described herein with respect to FIG. 7. The server 122 may be programmed to analyze the script code to determine whether the globally-anomalous script is malicious. If the script code indicates that the globally-anomalous script is malicious, the server 122 may send an alert to client computing devices 102, 128A, 128B, 128N that request web content from the web origin indicating that the script is malicious and should not be executed. In some examples, the alert is included with a message, such as the response message 132, including web content for rendering.

In some examples, the remedial action includes sending the script fingerprint data of the globally-anomalous script to an administrative user for further evaluation. In some examples, the remedial action includes instructing client computing devices 128A, 128B, 128N, 102 not to execute the considered script, until it is determined whether the script is malicious. In some examples, operation 306 may be omitted. For example, the server 122 may not determine whether script fingerprint data for the web origin is stabilized before executing the remedial action at operation 310 if a locally anomalous script is also globally-anomalous.

Figure 4:
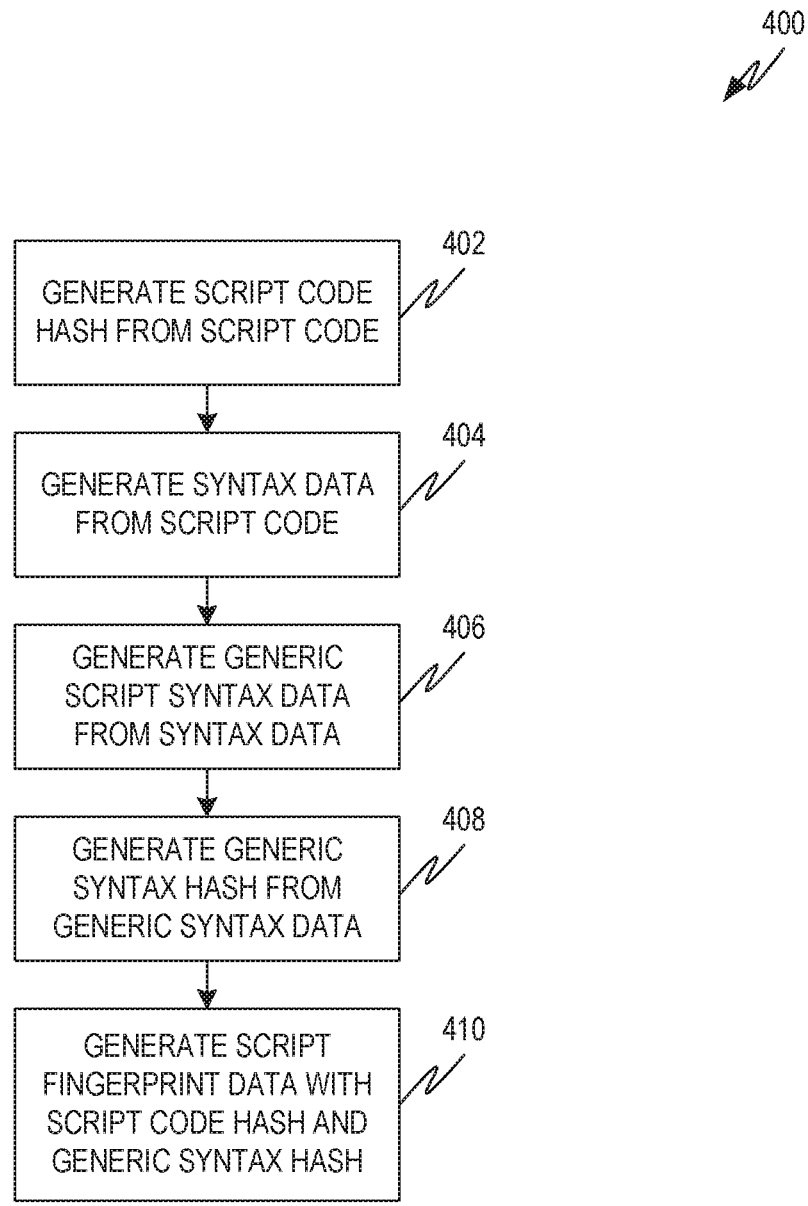
FIG. 4 is a flowchart showing one example of a process flow showing how a web browser may generate script fingerprint data from a script.

FIG. 4 is a flowchart showing one example of a process flow 400 showing how the web browser 104 may generate script fingerprint data from a script. The operations of the process flow 400 may be executed by the web browser 104 and/or by subcomponents of the web browser 104 such as the interpreter engine 108 and/or the rendering engine 110.

At the outset of the process flow 400, the web browser 104 may have the script code for executing the considered script. At operation 402, the web browser 104 generates a script code hash from the script code for the considered script. Generating the script code hash may include applying a hash function or other cryptographic function to the script code. Example hash functions that may be applied include SHA1, SHA-256, etc. The script code hash may be all or part of the script code data that is included in the script fingerprint data for the script.

At operation 404, the web browser 104 generates syntax data from the script code. The syntax data describes the syntax of the considered script. In some examples, the syntax data is or includes a syntax tree, such as an Abstract Syntax Tree. The syntax data represents the syntactic structure of the considered script including, for example, variable declarations, expressions, functions, literals, etc. Consider the example Listing [1] below:

[1]

```
1    var a = "Hello world!";
2    document.write(a);
```

Listing 1 shows example JavaScript code for an example script. Syntax data describing the script of Listing [1] may describe the declaration of the variable "a," the literal value of the variable, "Hello world!"; the expression "document-.write" and/or relationships there between. An example Abstract Syntax Tree describing the script code of Listing [1] is given by Listing [2] below:

[2]

```
1    body: [
2        VariableDeclaration {
3            declarations: [
4                VariableDeclarator {
5                    id: Identifier {
6                        name: "a"
7                    }
8                    init: Literal {
9                        value: "Hello world"
10                   }
11               }
12           ]
13           kind: "var"
14       }
15       ExpressionStatement {
16           expression: CallExpression {
17               callee: MemberExpression {
18                   object: Identifier {
19                       name: "document"
20                   }
21                   property: Identifier {
22                       name: "write"
23                   }
24               }
25               arguments: [
26                   Identifier {
```

[2]

```
27              name: "a"
28            }
29          ]
30        }
31     ]
```

At operation 406, the web browser 104 generates generic script syntax data from the script syntax data. The generic script syntax data, which may also be referred to as blueprint data, describes the syntactic structure of the considered script without reference to dynamic values. Dynamic values may include particular names or values for variables, literals and other data that may vary between different iterations of a dynamic script. In this way, generic script syntax data describes the syntax of dynamic scripts even if the dynamic scripts include different variables, literals, etc. For illustration, generic script syntax data corresponding to the example script of Listing [1] is given by Listing [3] below:

[3]

```
1    body: [
2      VariableDeclaration {
3        declarations: [
4          VariableDeclarator {
5            id: Identifier {
6              name: ID1
7            }
8            init: Literal {
9              value: STRING
10           }
11         }
12       ]
13       kind: "var"
14     }
15     ExpressionStatement {
16       expression: CallExpression {
17         callee: MemberExpression {
18           object: Identifier {
19             name: ID2
20           }
21           property: Identifier {
22             name: ID3
23           }
24         }
25         arguments: [
26           Identifier {
27             name: ID1
28           }
29         ]
30       }
31     ]
```

In Listing [3], the syntactic structure of the example script of Listing [1] is indicated. The variable "a," however, is replaced by a generic placeholder ID1. The literal string "Hello world" is replaced by a generic placeholder "STRING." The expressions "document" and "write" are replaced by generic identifiers "ID2" and "ID3," Listing [3] may describe different dynamic iterations of the example script of Listing [1].

Consider next an additional example script given by Listing [4]:

[4]

```
1    var a = "Goodbye moon?";
2    document.write(a);
```

The example script of Listing [4] is another dynamic iteration of the example script of Listing [1]. For example, the Listing [4] script has the same syntactic structure as the Listing [1] script, but has a different literal for the string (e.g., "Goodbye moon?" in place of "Hello world!"). Accordingly, the Listing [4] script, like the Listing [1] script, is also described by the example generic script syntax data of Listing [3].

Example Listing [5] below shows yet another example script this is another dynamic iteration of the Listing [1] and Listing [4] scripts:

[5]

```
1    var b = "Goodbye moon?";
2    document.write(b);
```

The Listing [5] script, relative to the Listing [1] script, changes both the literal string (e.g., "Goodbye moon?" in place of "Hello world!") and the variable name (e.g. "b" in place of "a"). Because it has the same syntactic structure as the Listing [1] and Listing [4] scripts, the Listing [5] script is also described by the generic script syntax data of Listing [3].

At operation 408, the web browser 104 generates a script syntax hash from the generic script syntax data. For example, the script syntax hash may be generated in a manner similar to that used to generate the script code hash. The script syntax hash, in some examples, makes up some or all of the script syntax data of the script fingerprint data. At operation 410, the web browser 104 generates script fingerprint data with the script code hash and the script syntax hash. For example, the script fingerprint data may include the script code hash and the script syntax hash. In some examples, the script fingerprint data also includes other data describing the considered script such as, for example, an indication of the web origin, an indication of whether the script was generated inline (e.g., with the web content) or via an eval API or from other interaction between the user and the web content. Listing [6] below shows one example format for script fingerprint data:

[6]

script origin (eval/inline) :
SHA256 (genericscript data) /
SHA256 (script code)

Figure 5:
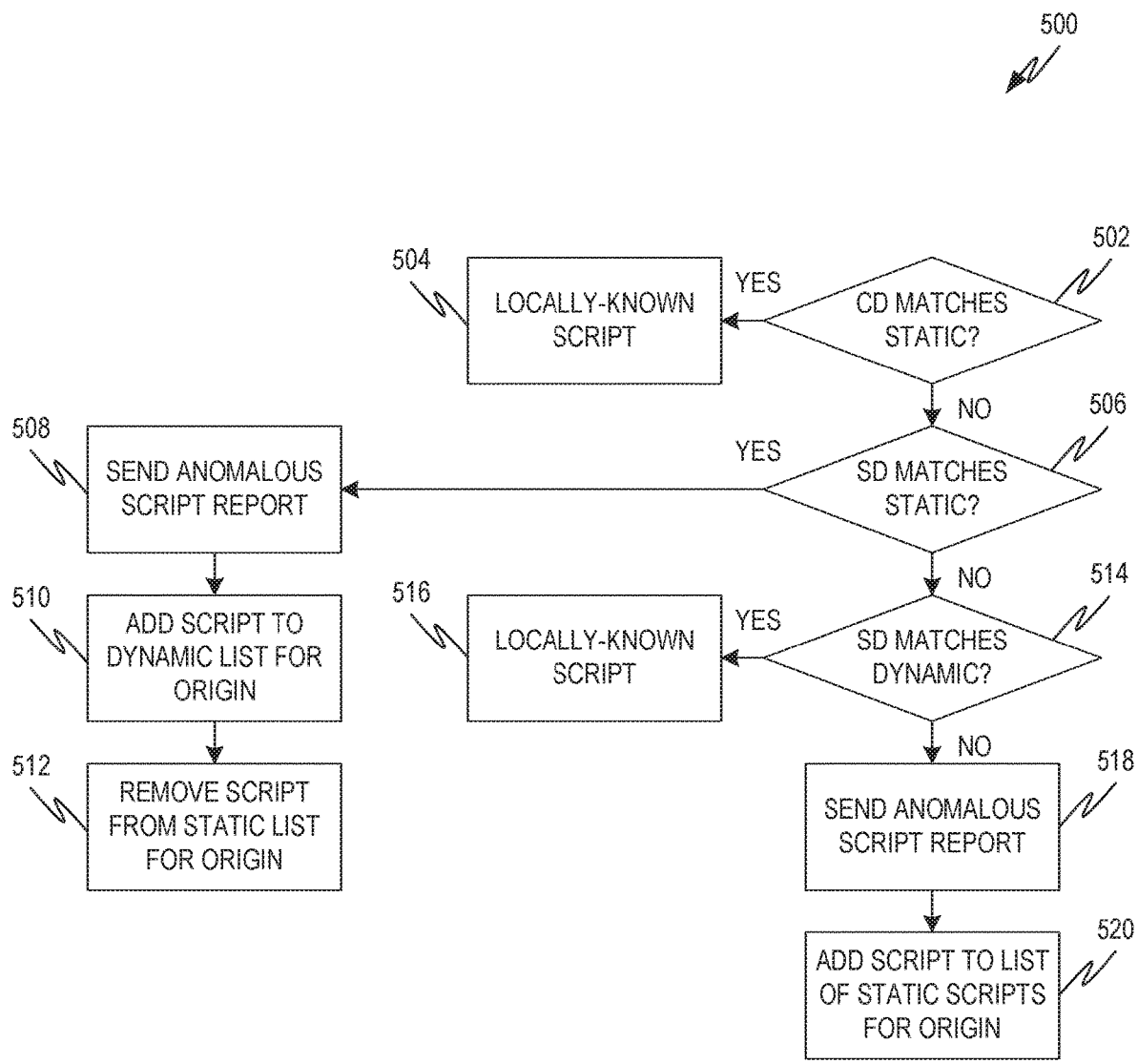
FIG. 5 is a flowchart showing one example of a process flow that may be executed by a web browser to compare script fingerprint data for a considered script to locally known script fingerprint data.

Example script fingerprint data describing the Listing [1] script according to the example format of Listing [6] is provided by Listing [7] below:

[7]

sap.com (inline) :
97ab80478e8e70e4133777a396267da39d455de982b
ad2349857e4167d3ada2 /
a87b41469d7dce372c4371a5e6b500cc58542de765dd
1856081194222661680c FIG. 5 is a flowchart showing one example of a process flow 500 that may be executed by the web browser 104 to compare script fingerprint data for a considered script to locally known script fingerprint data. The web browser 104 may begin with script fingerprint data for the considered script, for example, generated as described by the process flow 400. The web browser 104 may also begin with local known script data for the web origin associated with the considered script, such as a web origin record 120A, 120B, 120N. The local known script data may include a static script list including script fingerprint data for scripts known to be static and a dynamic script list including script fingerprint data for scripts known to be dynamic.

At operation 502, the web browser 104 determines if script code data for the considered script matches the script code data of any script fingerprint data on the static script list of the local known static script data. If such a match exists, it indicates that the considered script is a static script that is described by the local known script data. Accordingly, if a match is found, the web browser 104 determines, at operation 504, that the considered script is a known script.

If the script code data for the considered script does not match script code data from the static script list, the web browser determines, at operation 506, whether the syntax data for the considered script matches the syntax data of any script fingerprint data on the static script list. If such a match exists, it indicates that the considered script is a dynamic version of the matching static script. Accordingly, the web browser 104, at operation 508, sends an anomalous script report 134 to the server 122 including the script fingerprint data of the considered script and indicating that the considered script is an anomalous dynamic script. At operation 510, the web browser 104 adds the script fingerprint data of the considered script to the dynamic script list. At operation 512, the web browser 104 deletes the matching script fingerprint data from the static script list. For example, because the considered script is a dynamic version of the matching static script, the matching static script is not static and, therefore, is removed from the static script list. In some examples, the matching script fingerprint data from the static script list is removed from the static script list and added to the dynamic script list.

If the syntax data of the considered script does not match syntax data from the static script list, the web browser 104 determines, at operation 514, whether the syntax data of the considered script matches syntax data from any script fingerprint data on the dynamic script list. If a match is found, it indicates that the considered script is, or is an iteration of, a dynamic script described by the local known script data. Accordingly, the web browser 104 determines, at operation 516, that the considered script is locally known.

If the syntax data of the considered script does not match syntax data from the dynamic script list, it indicates that the considered script is not described by the known syntax data, either by the static script list or by the dynamic script list. Accordingly, the web browser 104 sends an anomalous script report 134 including the script fingerprint data of the considered script at operation 518. At operation 520, the web browser 104 adds the script fingerprint data of the considered script to the static script list.

FIG. 6 is a flowchart showing one example of a process flow 600 that may be executed by the server 122 to compare script fingerprint data for a locally anomalous script to global known script data. The server 122 may begin with script fingerprint data for the locally anomalous script, for example, received from a web browser, such as the web browser 104 with an anomalous script report 134. The server 122 may also begin with global known script data. The global known script data may include a static script list including script fingerprint data for scripts known to be static and a dynamic script list including script fingerprint data for scripts known to be dynamic.

At operation 602, the server 122 determines if script code data for the locally anomalous script matches the script code data of any script fingerprint data on the static script list of the globally known static script data. If such a match exists, it indicates that the locally anomalous script is a static script that is described by the global known script data. Accordingly, if a match is found, the server 122 determines, at operation 604, that the locally anomalous script is globally-known.

If the script code data for the locally anomalous script does not match script code data from script fingerprint data from the static script list, the server 122 determines, at operation 606, whether the syntax data for the locally anomalous script matches the syntax data of any script fingerprint data on the static script list. If such a match exists, it indicates that the locally anomalous script is a dynamic version of the matching known static script. Further, it indicates that the matching known static script is erroneously indicated as static. The server 122 determines, at operation 608, that the locally anomalous script is also globally-anomalous. At operation 610, the server 122 adds the script fingerprint data of the locally anomalous script to the dynamic script list. At operation 612, the server 122 deletes the matching script fingerprint data from the static script list. For example, because the locally anomalous script is a dynamic version of the matching static script, the matching static script is not static and, therefore, is removed from the static script list. In some examples, the matching script fingerprint data from the static script list is removed from the static script list and added to the dynamic script list.

If the syntax data of the locally anomalous script does not match syntax data from the static script list, the server 122 determines, at operation 614, whether the syntax data of the locally anomalous script matches syntax data from any script fingerprint data on the dynamic script list. If a match is found, it indicates that the locally anomalous script is, or is an iteration of, a dynamic script described by the global known script data. Accordingly, the server 122 determines, at operation 616, that the locally anomalous script is globally known.

If the syntax data of the locally anomalous script does not match syntax data from the dynamic script list, it indicates that the locally anomalous script is not described by the known syntax data, either by the static script list or the dynamic script list. Accordingly, the server 122 sends an anomalous script report 134 including the script fingerprint data of the locally anomalous script at operation 618. At operation 620, the server 122 adds the script fingerprint data of the locally anomalous script to the static script list.

As described herein, the web browser 104, in some examples, maintains a copy of the script code 112A, 112B at the retention cache 118. For example, the web browser 104 may maintain script code 112A, 112B from scripts determined to be locally anomalous scripts. Also, in some examples, the server 122 may notify the web browser 104 that a locally anomalous script is globally known. For example, the web browser 104 may delete script code from the globally known script from the retention cache in some examples.

Also, as described herein, the server 122 may be programmed to request script code for a script, such as a globally-anomalous script. In this way, the server 122 (or an associated administrative user) may determine whether the globally-anomalous script is malicious.

Figure 7:
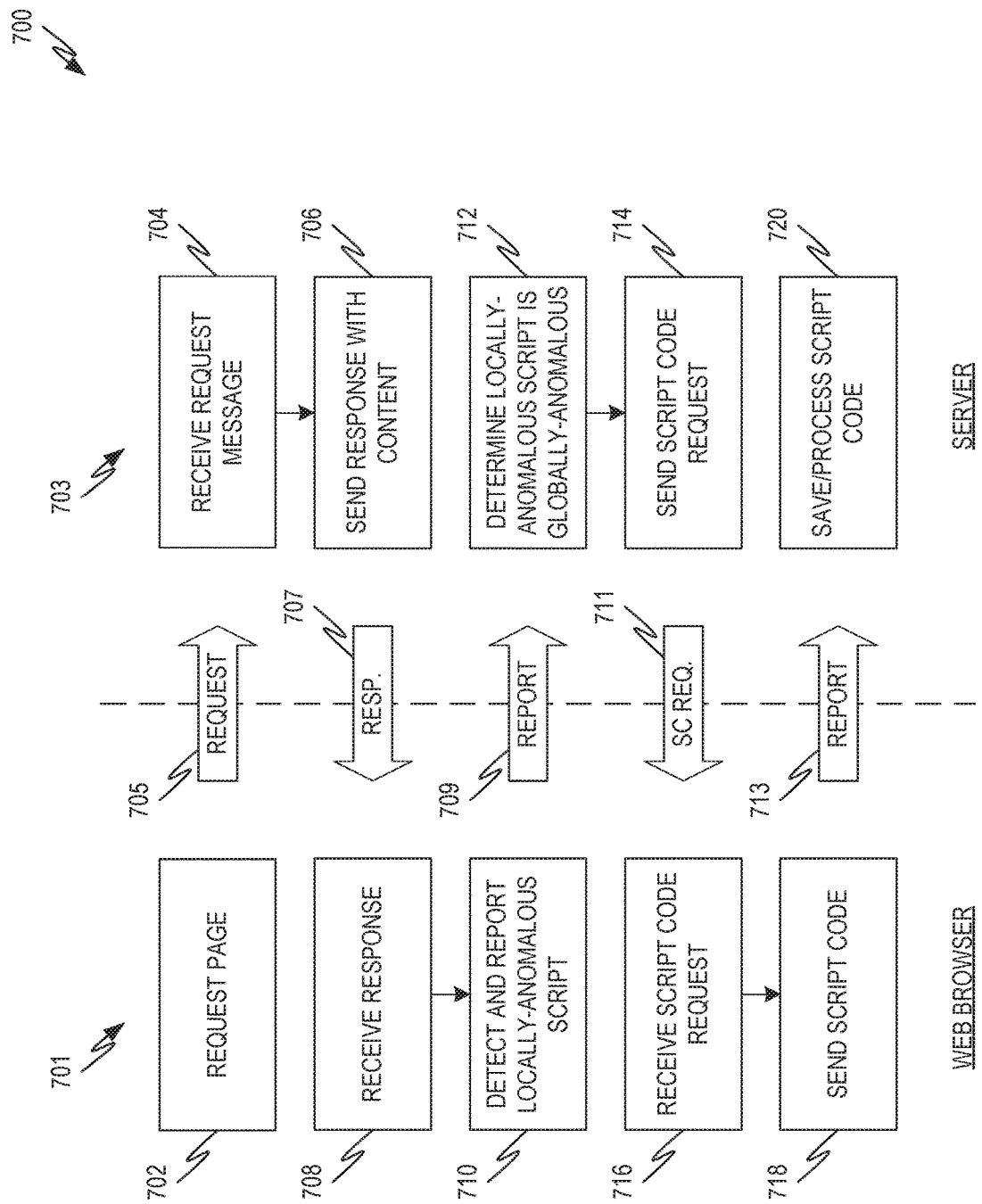
FIG. 7 is a flowchart showing one example of a process flow that may be executed by the web browser and the server to provide web content to the web browser and provide script code to the server.

FIG. 7 is a flowchart showing one example of a process flow 700 that may be executed by the web browser 104 and the server 122 to provide web content to the web browser 104 and provide script code to the server 122. The process flow 700 includes two columns 701,703. The column 701 includes operations executed by the web browser 104. The column 703 includes operations executed by the server 122.

At operation 702, the web browser 104 sends to the server 122 (e.g., a web origin associated with the server 122) a content request 705. The server 122 receives the content request 705 at operation 704. In reply, at operation 706, the server 122 sends a response message 707 including the requested content. The web browser 104 receives the response message 707 at operation 708.

At operation 710, the web browser 104 detects and reports a locally anomalous script. For example, the process flows 200, 400, and 500 show example ways that the web browser 104 can detect and report a locally anomalous script. To report the locally anomalous script, the web browser 104 may send an anomalous script report 709. The server 122 receives the anomalous script report 709 and, at operation 712, determines that the locally anomalous script is also globally-anomalous. For example, the process flow 600 shows one example way that the server 122 can determine that a locally anomalous script is also globally anomalous.

At operation 714, the server 122 sends a script code request 711 that requests that the web browser 104 provide script code for the locally anomalous script. The web browser 104 receives the script code request 711 at operation 716. At operation 718, the web browser 104 sends a script code report 713 including the requested script code. The server 122 saves and/or otherwise processes the requested script code at operation 720.

EXAMPLES

Example 1 is a system for securing a web browser, the system comprising: a client computing device comprising a processor and a data storage, wherein the client computing device is programmed to perform operations comprising: parsing, by the web browser executing at the client computing device, web content received from a server; identifying, by the web browser, a script associated with the web content received from the server; generating, by the web browser, script fingerprint data for the script, wherein the script fingerprint data comprises script code data describing script code for the script and script syntax data describing the script: determining, by the web browser, that the script fingerprint data is not described by local known script data; sending an anomalous script report by the web browser to the server, the anomalous script report comprising the script fingerprint data; and updating, by the web browser, the local known script data to describe the script fingerprint data.

In Example 2, the subject matter of Example 1 optionally includes wherein the script syntax data comprises generic script syntax data.

In Example 3, the subject matter of Example 2 optionally includes wherein generating the generic script syntax data comprises: generating a syntax tree describing the script; and removing at least one dynamic value from the syntax tree.

In Example 4, the subject matter of Example 3 optionally includes Wherein the client computing device is programmed to perform operations further comprising: generating a script code hash from the script code; and generating a script syntax hash from the generic script syntax data, wherein the script fingerprint data comprises the script code hash and the script syntax hash.

In Example 5, the subject matter of any one or more of Examples 1-4 optionally includes wherein determining that the script fingerprint data is not described by local known script data comprises: determining that the script code data describing the script is not described by script fingerprint data that is on a static script list of the local known script data; and determining that the script syntax data describing the script is described by script fingerprint data that is on the static script list.

In Example 6, the subject matter of Example 5 optionally includes wherein updating the local known script data to describe the script fingerprint data comprises: modifying the static script list to remove a reference to the script syntax data describing the script; and modifying a dynamic script list of the local known script data to describe at least a portion of the script fingerprint data.

In Example 7, the subject matter of any one or more of Examples 1-6 optionally includes wherein determining that the script fingerprint data is not described by the locally known script data comprises: determining that the script code data is not described by script fingerprint data that is on a static script list of the local known script data; determining that the script syntax data describing the script is not described by script fingerprint data on the static script list; and determining that the script syntax data describing the script is not described by script fingerprint data on a dynamic script list of the local known script data.

In Example 8, the subject matter of any one or more of Examples 1-7 optionally includes wherein the client computing device is programmed to perform operations further comprising: receiving, from the server, a script code request describing the script; and sending, to the server, the script code.

In Example 9, the subject matter of any one or more of Examples 1-8 optionally includes wherein the client computing device is programmed to perform operations further comprising receiving at least a portion of the local known script data from the server.

In Example 10, the subject matter of any one or more of Examples 1-9 optionally includes the server, wherein the server is programmed to perform operations comprising: receiving, from the client computing device, the anomalous script report; determining that global known script data has stabilized; determining that the script is not described by the global known script data; and executing a remedial action.

Example 11 is a method for securing a web browser, the method comprising: parsing, by the web browser, web content received from a server, wherein the web browser is executed by a client computing device; identifying, by the web browser, a script associated with the web content received from the server; generating, by the web browser, script fingerprint data for the script, wherein the script fingerprint data comprises script code data describing script code for the script and script syntax data describing the script; determining, by the web browser, that the script fingerprint data is not described by local known script data; sending an anomalous script report by the web browser to the server, the anomalous script report comprising the script fingerprint data; and updating, by the web browser, the local known script data to describe the script fingerprint data.

In Example 12, the subject matter of Example 11 optionally includes wherein the script syntax data comprises generic script syntax data.

In Example 13, the subject matter of Example 12 optionally includes wherein generating the generic script syntax data comprises: generating a syntax tree describing the script; and removing at least one dynamic value from the syntax tree.

In Example 14, the subject matter of Example 13 optionally includes generating a script code hash from the script code; and generating a script syntax hash from the generic script syntax data, wherein the script fingerprint data comprises the script code hash and the script syntax hash.

In Example 15, the subject matter of any one or more of Examples 11-14 optionally includes wherein determining that the script fingerprint data is not described by the local known script data comprises: determining that the script code data describing the script is not described by script fingerprint data that is on a static script list of the local known script data; and determining that script syntax data describing the script is described by script fingerprint data that is on the static script list.

In Example 16, the subject matter of Example 15 optionally includes wherein updating the local known script data to describe the script fingerprint data comprises: modifying the static script list to remove a reference to the script syntax data describing the script; and modifying a dynamic script list of the local known script data to describe at least a portion of the script fingerprint data.

In Example 17, the subject matter of any one or more of Examples 11-16 optionally includes wherein determining that the script fingerprint data is not described by local known script data comprises: determining that the script code data is not described by script fingerprint data that is on a static script list of the local known script data; determining that the script syntax data describing the script is not described by script fingerprint data on the static script list; and determining that the script syntax data describing the script is not described by script fingerprint data on a dynamic script list of the local known script data.

In Example 18, the subject matter of any one or more of Examples 11-17 optionally includes receiving, from the server, a script code request describing the script; and sending, to the server, the script code.

In Example 19, the subject matter of any one or more of Examples 11-18 optionally includes receiving at least a portion of the local known script data from the server.

Example 20 is a non-transitory machine-readable medium comprising instructions thereon that, when executed by a processor, causes the process to perform operations comprising: parsing, by a web browser executing at the processor, web content received from a server; identifying, by the web browser, a script associated with the web content received from the server; generating, by the web browser, script fingerprint data for the script, wherein the script fingerprint data comprises script code data describing script code for the script and script syntax data describing the script; determining, by the web browser, that the script fingerprint data is not described by local known script data; sending an anomalous script report by the web browser to the server, the anomalous script report comprising the script fingerprint data; and updating, by the web browser, the local known script data to describe the script fingerprint data.

Figure 8:
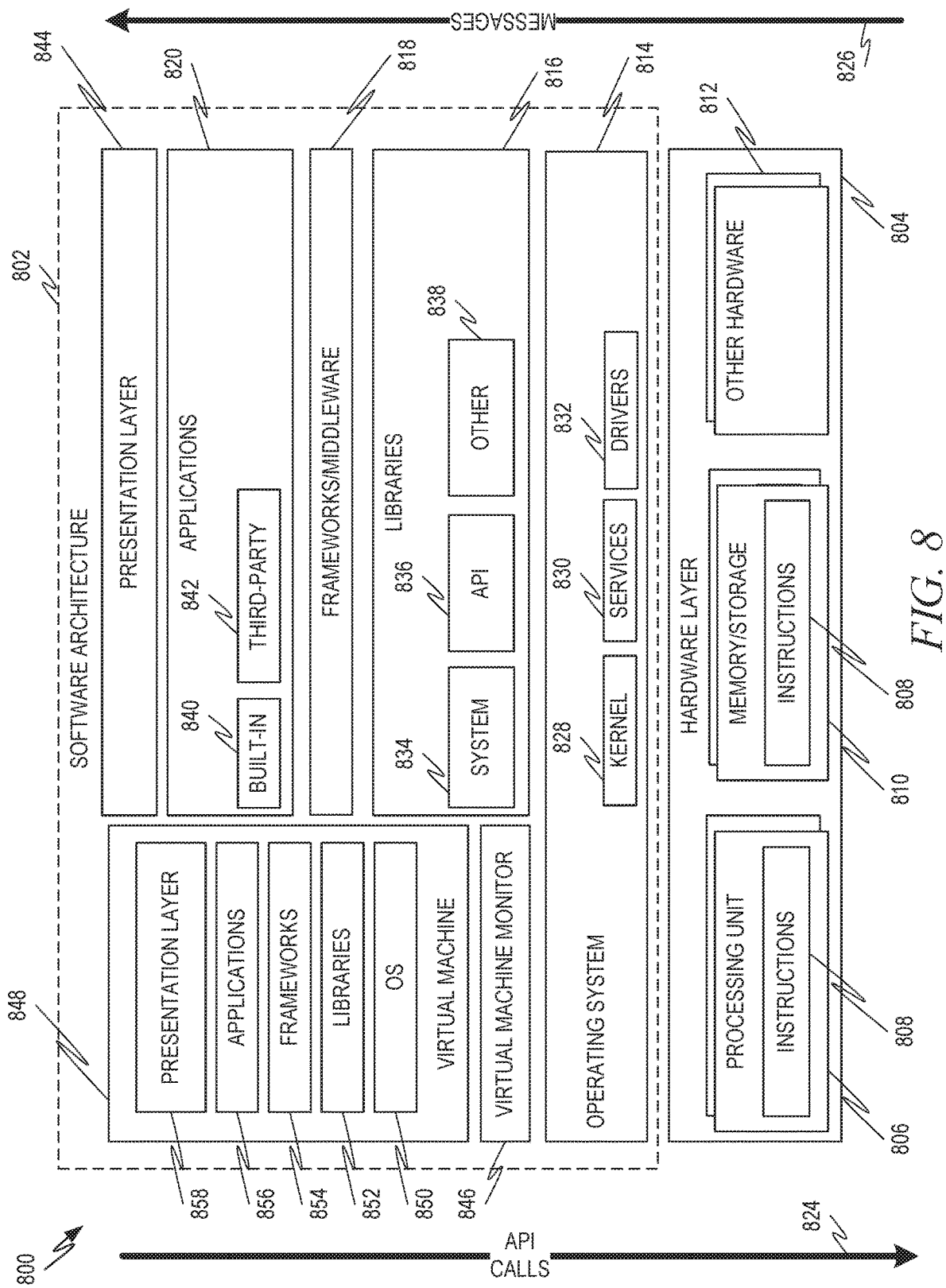
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system 900 of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812, which represents any other hardware of the hardware layer 804, such as the other hardware illustrated as part of computer system 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 811 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules. In some examples, libraries 816 may provide one or more APIs serviced by a message oriented middleware.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine 848 is hosted by a host operating system (operating system 814) and typically, although not always, has a virtual machine monitor 846, which manages the operation of the virtual machine 848 as well as the interface with the host operating system operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where Multiple of such hardware-implemented modules exist contemporaneously, communications may be achieved through signal transmission (e.g., over appropriate circuits and buses that connect the hardware-implemented modules). In embodiments in Which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a. "cloud computing" environment or as a "software as a service" (SaaS). For example, at least some of the operations may be performed by a group of computers (as examples of machines including processors), these operations being accessible via a network e.g., the Internet) and via one or more appropriate interfaces e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
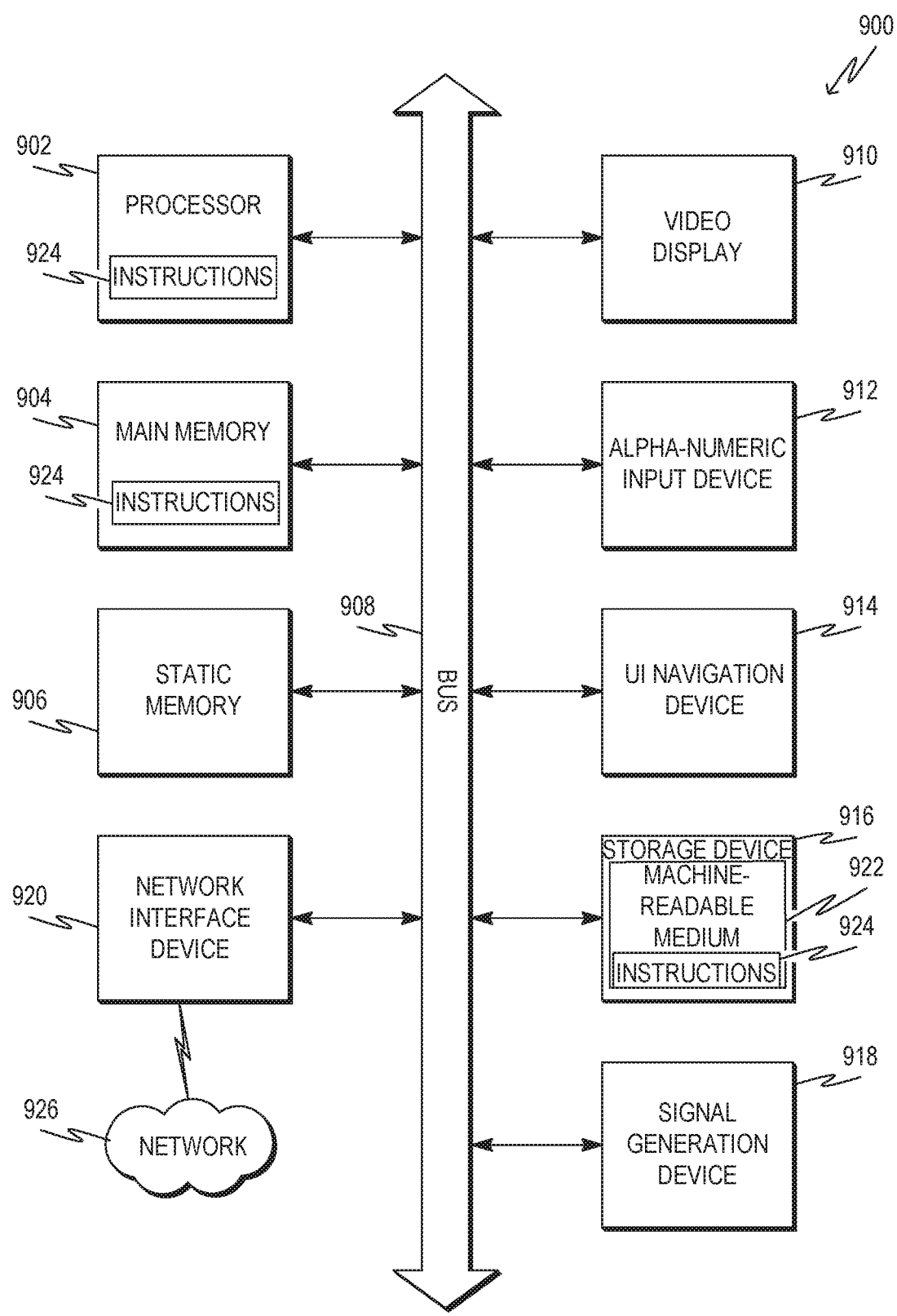
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 950 (e.g., a liquid crystal display (LCD) or a cathode ray tube (CRT)). The computer system 900 also includes an alphanumeric input device 952 a keyboard or a touch-sensitive display screen), a user interface (UI) navigation (or cursor control) device 954 (e.g., a mouse), a disk drive device 956, a signal generation device 958 (e.g., a speaker), and a network interface device 920.

Machine-Readable Medium

The disk drive unit 956 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for securing a web browser, the system comprising:
a client computing device comprising a hardware processor and a hardware data storage, wherein the client computing device is programmed to perform operations comprising:
parsing, by the web browser executing at the client computing device, first web content received from a server;
identifying, by the web browser, a first script associated with the first web content received from the server;
generating, by the web browser, first script fingerprint data for the first script, wherein the first script fingerprint data comprises first script code data describing script code for the first script and first script syntax data describing the first script;
determining, by the web browser, that the first script code data is not described by a static script list indicating local known static scripts;
determining, by the web browser, that the first script syntax data is described by the static script list;
modifying the static script list to remove a reference to the first script syntax data;
modifying a dynamic script list indicating local known dynamic scripts to include a reference to at least a portion of the first script fingerprint data; and
sending an anomalous script report by the web browser to the server, the anomalous script report comprising the first script fingerprint data.

2. The system of claim 1, wherein the first script syntax data comprises generic script syntax data.

3. The system of claim 2, wherein generating the generic script syntax data comprises:
generating a syntax tree describing the first script; and
removing at least one dynamic value from the syntax tree.

4. The system of claim 3, wherein the client computing device is programmed to perform operations further comprising:
generating a script code hash from the first script code; and
generating a script syntax hash from the generic script syntax data, wherein the script fingerprint data comprises the script code hash and the script syntax hash.

5. The system of claim 1, the operations further comprising:
identifying, by the web browser, a second script received from the server;
generating, by the web browser, second script fingerprint data for the second script, the second script fingerprint data comprising second script code data describing script code for the second script and second script syntax data describing the second script;
determining that the second script code data is not described by script fingerprint data that is on a static script list of the local known script data;
determining that the second script syntax data is not described by script fingerprint data on the static script list; and
determining that the second script syntax is not described by script fingerprint data on a dynamic script list of the local known script data.

6. The system of claim 1, wherein the client computing device is programmed to perform operations further comprising:

receiving, from the server, a script code request describing the first script; and sending, to the server, the script code for the first script.

7. The system of claim 1, wherein the client computing device is programmed to perform operations further comprising receiving at least a portion of the static script list or the dynamic script list from the server.

8. The system of claim 1, further comprising the server, wherein the server is programmed to perform operations comprising:

receiving, from the client computing device, the anomalous script report;

determining that global known script data has stabilized;

determining that the first script is not described by the global known script data; and executing a remedial action.

9. The system of claim 1, the generating of the first script fingerprint data comprising:

accessing a syntax tree describing the first script, the syntax tree describing a first literal from the first script, a first variable from the first script, and a first expression from the first script;

replacing, at the syntax tree, a name of the first literal with a first generic placeholder;

replacing, at the syntax tree, a name of the first variable with a second generic placeholder; and replacing, at the syntax tree, a name of the first expression with a third generic placeholder.

10. A method for securing a web browser, the method comprising:

parsing, by the web browser, web content received from a server, wherein the web browser is executed by a client computing device;

identifying, by the web browser, a first script associated with the web content received from the server;

generating, by the web browser, first script fingerprint data for the script, wherein the first script fingerprint data comprises first script code data describing script code for the first script and first script syntax data describing the first script;

determining, by the web browser, that the first script code data is not described by a static script list indicating local known static scripts;

determining, by the web browser, that the first script syntax data is described by the static script list;

modifying the static script list to remove a reference to the script syntax data;

modifying a dynamic script list indicating local known dynamic scripts to include a reference to at least a portion of the script fingerprint data; and sending an anomalous script report by the web browser to the server, the anomalous script report comprising the script fingerprint data.

11. The method of claim 10, wherein the first script syntax data comprises generic script syntax data.

12. The method of claim 11, wherein generating the generic script syntax data comprises:

generating a syntax tree describing the first script; and removing at least one dynamic value from the syntax tree.

13. The method of claim 12, further comprising generating a script code hash from the first script code; and generating a script syntax hash from the generic script syntax data, wherein the script fingerprint data comprises the script code hash and the script syntax hash.

14. The method of claim 10, wherein determining that the script fingerprint data is not described by local known script data comprises:

identifying, by the web browser, a second script received from the server;

generating, by the web browser, second script fingerprint data for the second script, the second script fingerprint data comprising second script code data describing script code for the second script and second script syntax data describing the second script;

determining that the second script code data is not described by script fingerprint data that is on a static script list of the local known script data;

determining that the second script syntax data is not described by script fingerprint data on the static script list; and determining that the second script syntax data is not described by script fingerprint data on a dynamic script list of the local known script data.

15. The method of claim 10, further comprising:

receiving, from the server, a script code request describing the first script; and sending, to the server, the script code for the first script.

16. The method of claim 10, further comprising receiving at least a portion of the static script list or the dynamic script list from the server.

17. The method of claim 10, the generating of the first script fingerprint data comprising:

accessing a syntax tree describing the first script, the syntax tree describing a first literal from the first script, a first variable from the first script, and a first expression from the first script;

replacing, at the syntax tree, a name of the first literal with a first generic placeholder;

replacing, at the syntax tree, a name of the first variable with a second generic placeholder; and replacing, at the syntax tree, a name of the first expression with a third generic placeholder.

18. A non-transitory machine-readable medium comprising instructions thereon that, when executed by a processor, causes the process to perform operations comprising:

parsing, by a web browser executing at the processor, web content received from a server;

identifying, by the web browser, a first script associated with the web content received from the server;

generating, by the web browser, first script fingerprint data for the first script, wherein the first script fingerprint data comprises first script code data describing script code for the first script and first script syntax data describing the first script;

determining, by the web browser, that the first script code data is not described by a static script list indicating local known static scripts;

determining, by the web browser, that the first script syntax data is described by the static script list;

modifying the static script list to remove a reference to the first script syntax data;

modifying a dynamic script list indicating local known dynamic scripts to include a reference to at least a portion of the first script fingerprint data; and sending an anomalous script report by the web browser to the server, the anomalous script report comprising the script fingerprint data.

19. The medium of claim 18, the generating of the first script fingerprint data comprising:

accessing a syntax tree describing the first script, the syntax tree describing a first literal from the first script, a first variable from the first script, and a first expression from the first script;

replacing, at the syntax tree, a name of the first literal with a first generic placeholder;

replacing, at the syntax tree, a name of the first variable with a second generic placeholder; and replacing, at the syntax tree, a name of the first expression with a third generic placeholder.

* * * * *